US009411772B2

(12) United States Patent
Jones

(10) Patent No.: US 9,411,772 B2
(45) Date of Patent: Aug. 9, 2016

(54) MULTI-PROTOCOL SERIAL NONVOLATILE MEMORY INTERFACE

(71) Applicant: Echelon Corporation, San Jose, CA (US)

(72) Inventor: Thomas Carleton Jones, San Jose, CA (US)

(73) Assignee: Echelon Corporation, San Jose, CA (US)

( * ) Notice: Subject to any disclaimer, the term of this patent is extended or adjusted under 35 U.S.C. 154(b) by 218 days.

(21) Appl. No.: 14/319,271

(22) Filed: Jun. 30, 2014

(65) Prior Publication Data

US 2015/0378959 A1    Dec. 31, 2015

(51) Int. Cl.
| | |
|---|---|
| *G06F 11/00* | (2006.01) |
| *G06F 13/42* | (2006.01) |
| *G06F 3/06* | (2006.01) |
| *G06F 13/364* | (2006.01) |
| *G06F 11/07* | (2006.01) |
| *G06F 11/14* | (2006.01) |

(52) U.S. Cl.
CPC ............ *G06F 13/4291* (2013.01); *G06F 3/061* (2013.01); *G06F 3/0661* (2013.01); *G06F 3/0679* (2013.01); *G06F 11/0757* (2013.01); *G06F 11/1469* (2013.01); *G06F 13/364* (2013.01); *G06F 2201/84* (2013.01); *G06F 2206/1014* (2013.01)

(58) Field of Classification Search
CPC .................................................. G06F 13/4291
See application file for complete search history.

(56) References Cited

U.S. PATENT DOCUMENTS

| | | | | |
|---|---|---|---|---|
| 7,000,056 B2 * | 2/2006 | Poisner | ................... | G11C 5/066 710/105 |
| 8,176,209 B2 * | 5/2012 | Yoo | ....................... | G06F 13/4291 710/5 |
| 8,981,754 B1 * | 3/2015 | Rohilla | ............... | H03M 1/1014 323/282 |
| 2013/0031276 A1 * | 1/2013 | Rathi | ....................... | H04L 69/18 710/8 |
| 2014/0136738 A1 * | 5/2014 | Matlock | ................ | G06F 13/387 710/104 |
| 2015/0363353 A1 * | 12/2015 | Enami | .................. | G06F 13/4282 710/110 |

* cited by examiner

*Primary Examiner* — Christopher McCarthy
(74) *Attorney, Agent, or Firm* — Nicholson De Vos Webster & Elliott, LLP

(57) ABSTRACT

An electronic device including a multi-protocol serial nonvolatile memory interface is disclosed. The interface includes: a first line operative to perform functions of a first chip select line when the interface operates as a SPI of the electronic device; a second line operative to perform functions of a second chip select line when the interface operates as the SPI of the electronic device; a third line operative to perform functions of a clock line when the interface operates as either the SPI or an I2C interface of the electronic device, and a fourth line configured to perform functions of a mast-out-slave-in (MOSI) line and a master-in-slave-out (MISO) line when the interface operates as the SPI of the electronic device, the fourth line further operative to perform functions of a serial data line when the interface operates as the I2C interface of the electronic device.

20 Claims, 14 Drawing Sheets

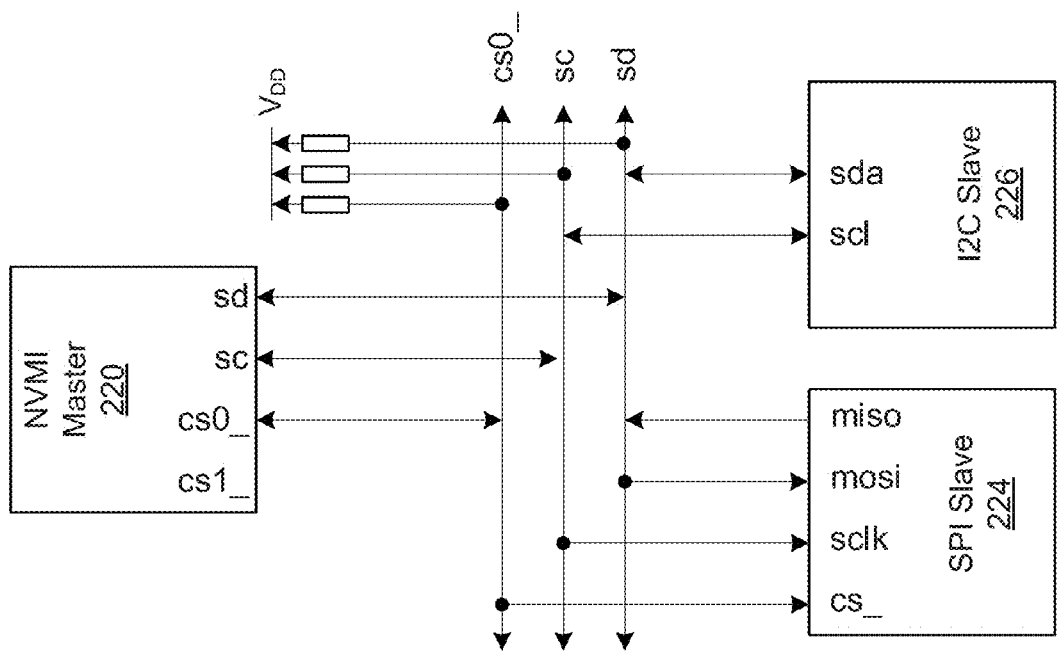

MULTI-PROTOCOL SERIAL NONVOLATILE MEMORY INTERFACE

FIELD OF THE INVENTION

The invention relates to embedded system communications. Specifically, it relates to communications in embedded systems.

PRIOR ART AND RELATED ART

There are two dominant serial protocols used to communicate with NVMs in embedded systems:
  I2C—Inter-Integrated Circuit (also referred to by "I²C", "IIC", but will be referred to as "I2C" in this specification) interface (often referred as I2C or I2C bus, without "interface" denoting the circuit being an interface), and
  SPI—Serial Peripheral Interface or SPI bus.

Both serial protocols are used for a variety of peripheral devices (e.g. sensors, switches, actuators, indicators, LCD displays, etc.) in embedded systems. Standard (fast-mode plus) I2C is a multi-master, half-duplex, two-wire interface that runs at speeds up to 1 Mbps. Data, carried on the serial data line (generally referred to as SDA) is clocked on the serial clock line (SCL), and control signaling is conveyed by a combination of the two. FIG. 1A illustrates SDA and SDL signaling and data transfer via changes of voltage levels in I2C. I2C generally requires two IC pins to communicate with one other, one pin for each.

In I2C, the Start condition (Start 102 in FIG. 1A) is signaled by dropping SDA to low while holding SCL high. Likewise, the Stop condition (Stop 104 in FIG. 1A) is signaled by raising SDA to high while SCL is high. A data bit is transferred via SDA, the serial data line, when the SCL, the serial clock line, is cycled high and then low.

SPI is a de facto standard, and as such there is no central interface specification. However, it is known in the art that SPI is a single-master, full-duplex, four-wire interface that can run at many tens of Mbps, but typically runs at about 10 Mbps or less. It consists of an active-low chip-select (CS_) (sometimes referred to as $\overline{SS}$ or slave select), serial clock (SCLK) and data for each direction (MOSI or master-out-slave-in and MISO or master-in-slave-out). FIG. 1B illustrates one the four modes of clocking in SPI. SPI bus generally requires four IC pins to communicate to one another, one pin for each wire.

An electronic device may need to communicate with another electronic device supporting either protocol, in which case the electronic device may have to have both I2C and SPI interfaces, which requires six IC pins to perform interface functions. When there are more devices for the electronic device to communicate when, even more extra pins are required. It is desirable to have an interface that is compatible with both protocols and require fewer IC pins.

SUMMARY OF THE INVENTION

An electronic device including a multi-protocol serial nonvolatile memory (NVM) interface is disclosed. The electronic device is to be coupled to a set of electronic devices, each of the set of electronic devices includes an interface for coupling to the electronic device, and each interface is either a serial peripheral interface (SPI) or an inter-integrated circuit (I2C) interface. The serial nonvolatile memory interface includes: a first line operative to perform functions of a first chip select line when the serial nonvolatile memory interface operates as a SPI of the electronic device; a second line operative to perform functions of a second chip select line when the serial nonvolatile memory interface operates as the SPI of the electronic device; a third line operative to perform functions of a clock line when the serial nonvolatile memory interface operates as either the SPI or an I2C interface of the electronic device, and a fourth line configured to perform functions of a mast-out-slave-in (MOSI) line and a master-in-slave-out (MISO) line when the serial nonvolatile memory interface operates as the SPI of the electronic device, the fourth line further operative to perform functions of a serial data line when the serial nonvolatile memory interface operates as the I2C interface of the electronic device.

A method of communicating between an electronic device and a set of electronic devices via a nonvolatile memory interface is disclosed. Each of the set of electronic devices includes an interface for coupling to the electronic device, and each interface is either a serial peripheral interface (SPI) or an inter-integrate circuit (I2C) interface. The method comprises causing a first line of the electronic device to perform functions of a first chip select line when the serial nonvolatile memory interface operates as a SPI of the electronic device, causing a second line of the electronic device to perform functions of a second chip select line when the serial nonvolatile memory interface operates as the SPI of the electronic device, and causing a third line of the electronic device to perform functions of a clock line when the serial nonvolatile memory interface operates as either the SPI or an I2C interface of the electronic device. The method further comprises causing a fourth line of the electronic device to perform functions of a mast-out-slave-in (MOSI) line and a master-in-slave-out (MISO) line when the serial nonvolatile memory interface operates as the SPI of the electronic device, the fourth line further operative to perform functions of a serial data line when the serial nonvolatile memory interface operates as the I2C interface of the electronic device.

The multiprotocol serial nonvolatile memory interface and methods utilizing it make communications between the electronic device and the set of electronic devices more efficient.

BRIEF DESCRIPTION OF THE DRAWINGS

FIG. 2A illustrates the line mapping between the Nonvolatile Memory Interface, henceforth "NVMI", and SPI/I2C according to one embodiment of the invention.

FIG. 2B illustrates a system-level connectivity view of a single NVMI master with NVM slaves of either protocol according to one embodiment of the invention.

DETAILED DESCRIPTION

Figure 1A:
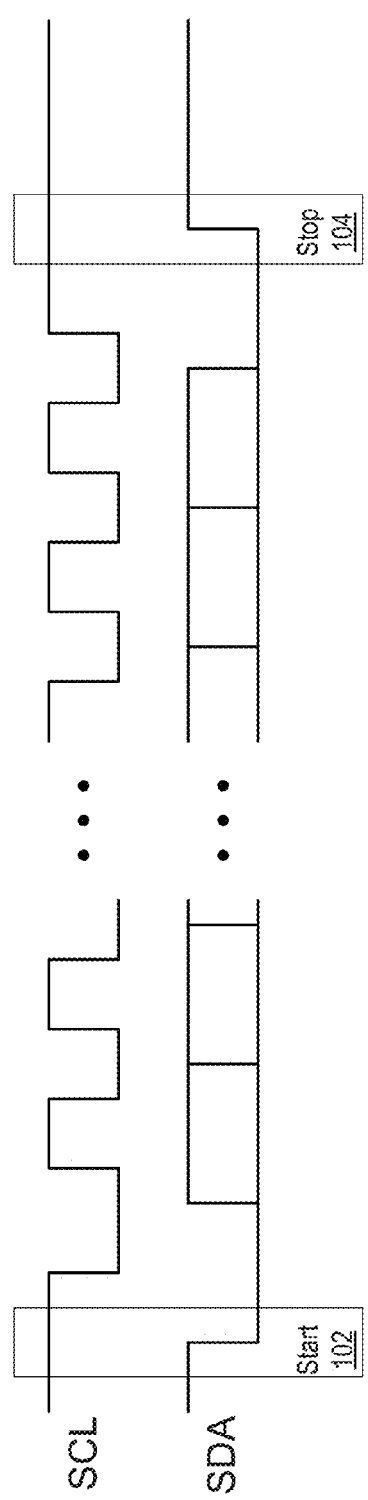
FIG. 1A illustrates SDA and SDL signaling and data transfer via changes of voltage levels in I2C
Figure 1B:
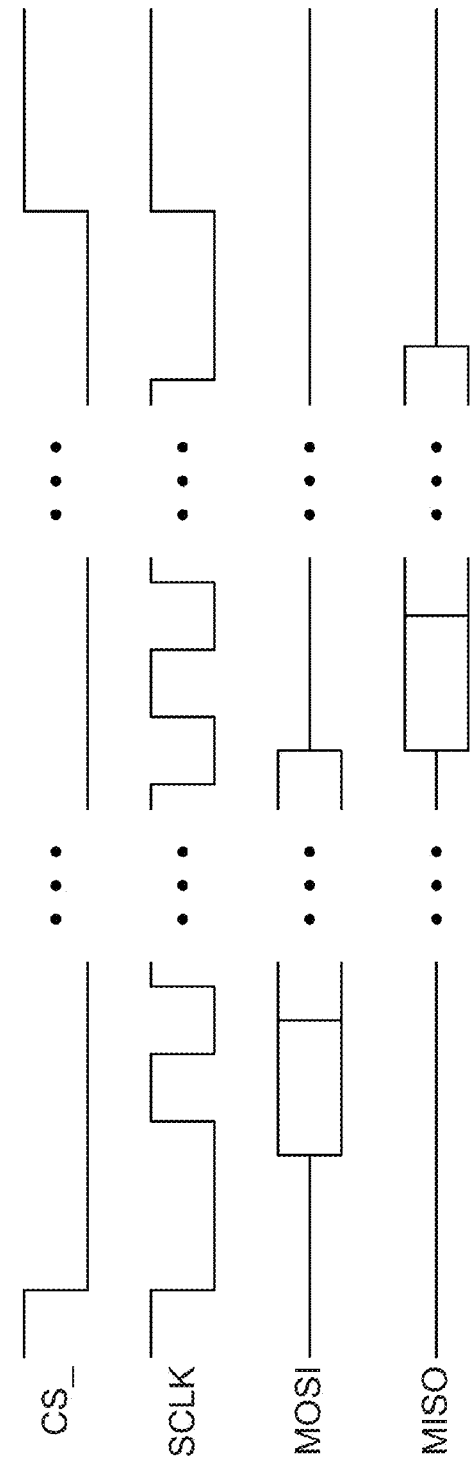
FIG. 1B illustrates one the four modes of clocking in SPI.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. The electronic devices discussed herein contains interfaces such as I2C, SPI, and an integrated interface for both I2C and SPI.

Interface Configuration

Embodiments of the invention propose a serial nonvolatile memory interface (NVMI) that is compatible to both I2C and SPI and comprises of four lines (e.g., each line being a wire) to perform communication for both SPI and I2C. The NVMI requires only four IC pins corresponding to the four lines. Since the NVMI interface needs only four IC pins, while an interface of disparate SPI and I2C support requires six pins to operate, the NVMI interface is more efficient than earlier interfaces.

In addition, the four-line NVMI may communicate simultaneously with (1) up to two electronic devices with a SPI bus (referred to as SPI devices), for example, an EEPROM and a flash; and (2) any number of electronic devices with a I2C interface (referred to as I2C devices) within the bounds of bus loading constraints. Note unless specified otherwise, NVMI denotes a multiprotocol serial nonvolatile memory interface implementing embodiments of the present invention in this specification. The embodiments of the invention are optimized for NVMs, such as electrically erasable programmable read-only memories (EEPROMs) and Flash Memories. Data, configuration and programming are stored in these NVMs. Note, however, a person having ordinary skill in the art may easily extend the principle of the invention to other types of SPI or I2C devices (e.g. sensors, switches, actuators, indicators, LCD displays, etc.) that comply with the timing characteristics of the conditions for operating the multiprotocol nonvolatile memory interface discussed herein below. In other words, the embodiments discussed herein on the multiprotocol nonvolatile memory interface with regard to this invention are only exemplary embodiments of all integrated SPI/I2C devices implementing the principle of the invention.

FIG. 2A illustrates the line mapping between NVMI and SPI/I2C according to one embodiment of the invention. SPI contains two chip-select wires, CS1_ and CS0_, and they map to chip-select wires cs1_ and cs0_ respectively. SPI also contains a serial clock wire SCLK, which maps to a serial clock line sc of NVMI. The I2C contains a serial clock line (SCL), and it maps to a serial clock (sc) line of NVMI; and the serial data line (SDA) maps to serial data (sd) line of NVMI.

While SPI is not natively a multi-master protocol, embodiments of the invention provide for three level of master multiplicity:

Single master,
Passive dual-master, and
Multi-master.

In other words, embodiments of the invention envision an electronic device with the proposed NVMI. In one embodiment, it serves as a master device (referred to as a NMVI master) in communication with a set of one or more electronic devices serving as slave devices (referred to as NMV slaves) for accessing nonvolatile memory. The slave devices contain either SPI or I2C, through which they communicate with the NMVI master. Note that the roles of master and slave are not necessarily fixed with the master and slave devices. For example, for communication through I2C, the roles of master and slave may be changed between messages, after a Stop is sent.

Standard I2C arbitration may be used in a strictly I2C setting. For SPI all masters need to be NVMI compliant. The chip-select signals are repurposed for NVMI arbitration. The arbitration is detailed further herein below.

FIG. 2B illustrates a system-level connectivity view of a single NVMI master with NVM slaves of either protocol according to one embodiment of the invention. NVMI master 220 is coupled to SPI slave 224 and I2C slave 226. A single chip select line cs0_ is utilized as only one SPI device is coupled. The sc line of NVMI master 220 is coupled to both the sclk line of SPI slave 224 the scl line of I2C slave 226 respectively. Similarly, the sd line of NVMI master 220 is coupled to both the MOSI and MISO wires of SPI slave 224 and sda line of I2C slave 226 respectively. Note each shared line is powered by a power supply $V_{DD}$ according to one embodiment of the invention. The lines cs0_, sc, and sd each is on a shared bus among the master and slave devices.

Figure 2C:
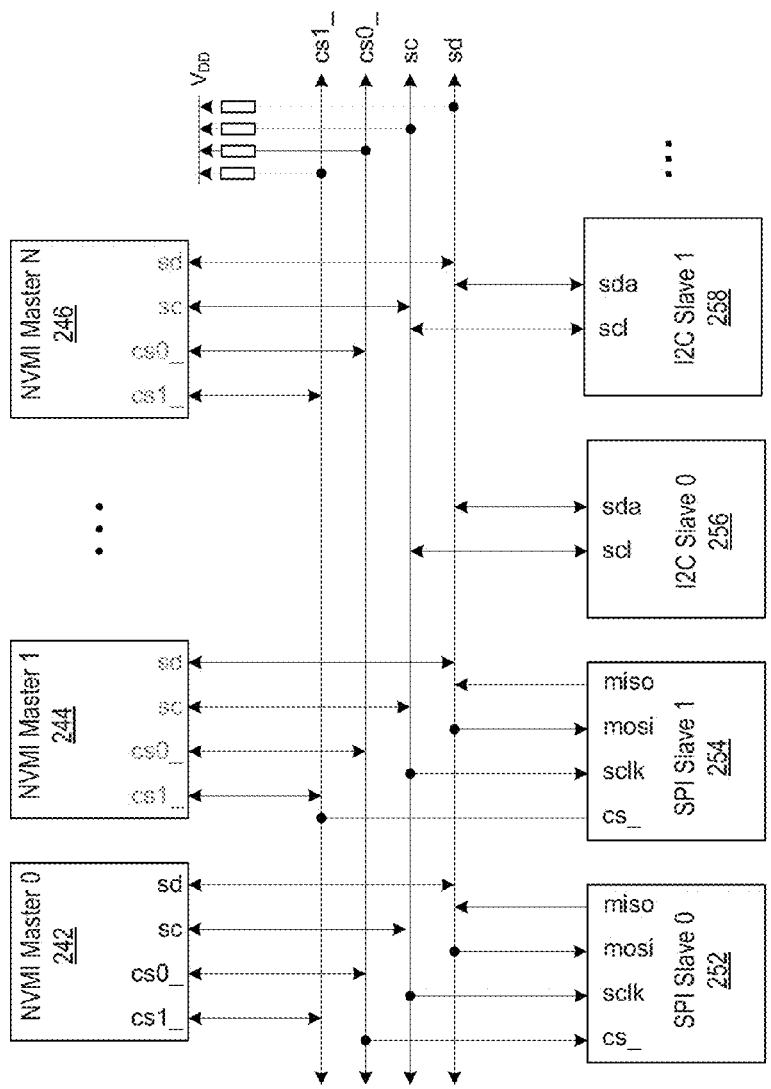
FIG. 2C illustrates a system-level connectivity view of multiple NVMI masters with multiple NVM slaves of either protocol according to one embodiment of the invention.

FIG. 2C illustrates a system-level connectivity view of multiple NVMI master with multiple NVM slaves of either protocol according to one embodiment of the invention. NVMI master 0 (242) to NVMI master N (246) are coupled to SPI slave 0 (252) and SPI slave (254). Note each SPI slave is coupled to a different chip select line, and thus only up to two SPI slaves may be supported in the multiple master-slave setup. The clock line sc coupled to the multiple NVMI masters is shared among all the SPI slaves and I2C slaves through a shared bus. Similarly, the sd line coupled to the multiple NVMI masters is shared among all the SPI slaves and I2C slaves through a shared bus.

Electronic Devices with Multiprotocol Nonvolatile Memory Interface

Figure 3:
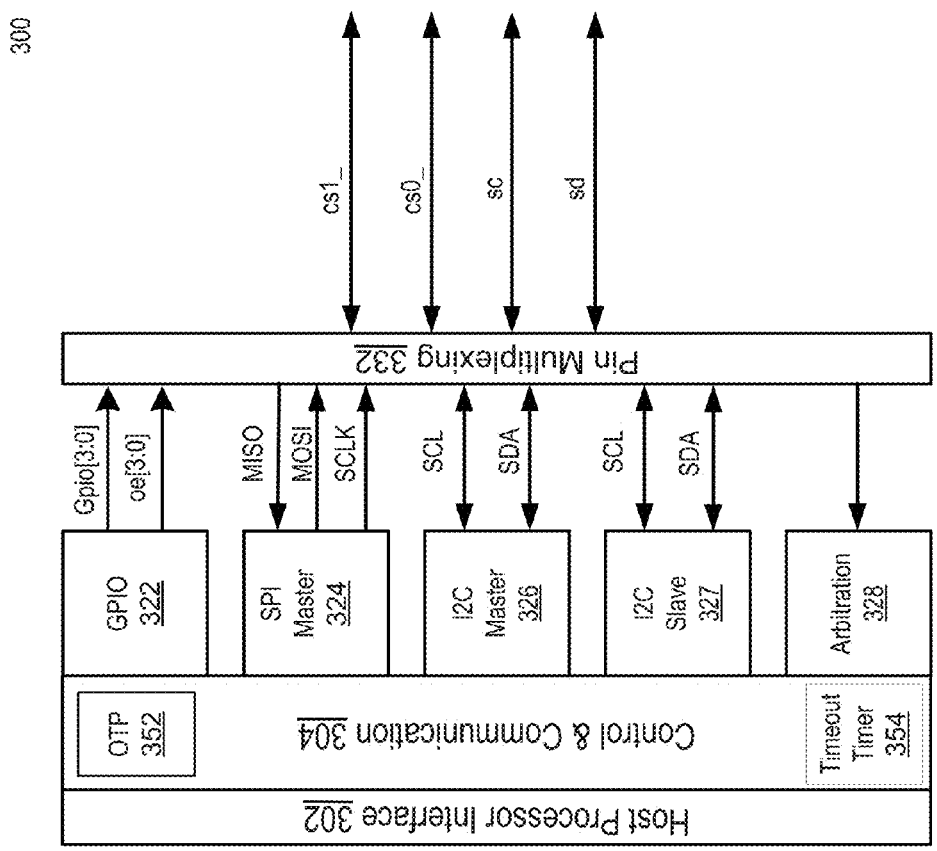
FIG. 3 illustrates an electronic device's functional blocks relating to a multiprotocol NVMI according to one embodiment of the invention.

FIG. 3 illustrates an electronic device's functional blocks relating to a multiprotocol nonvolatile memory interface according to one embodiment of the invention. Electronic device 300 contains several functional blocks relating to the multiprotocol nonvolatile memory interface. Host processor interface 302 is to communicate with the host processor of the electronic device. Control and communication module 304 is the functional block to exercise control on communication for the received data through the four lines of the NVMI.

Control and communication module 304 contains an on-chip one-time programmable (OTP) memory to store a unique identification (ID) for the multiprotocol nonvolatile memory interface, NVMI, according to one embodiment of the invention, and its application in multi-master operation is discussed in more details herein below. In addition, control and communication module 304 contains a timeout timer 354 according to one embodiment of the invention. The timeout timer is for resolving contention among multiple NVMIs. When multiple NVMIs are coupled together as SPI master devices, they will go through arbitration to determine which NVMI gets access to a shared bus to manage SPI slave devices. Timeout timer 354 starts running when the arbitration starts, and after it expires and the contention has not been resolved yet, timeout timer 354 triggers the NVMI to recovery (e.g., reset the interface) so that deadlock of a contention can be resolved. Note that timeout timer 354 may reside in the host processor coupled to host processor interface 302 in some embodiments.

Data may be processed through general-purpose input/output (GPIO) block 322, SPI master block 324, I2C master block 326, I2C slave block 327, and arbitration block 328. GPIO block 322 allows the NVMI access to the host processor thus the NVMI may be extended. The GPIO block may also provide additional error recovery procedures as well as general utility. Note that the illustrated bit distribution of the line is exemplary only, where the GPIO function takes 4 bits, output enable (oe) function takes 4 bits. The GPIO and output enables are used in conjunction to create the output chip select function in one embodiment of the invention.

SPI master 324 contains the functions compatible to a SPI master device, and includes functions for interactions with MISO, MOSI, and SCLK lines, while the chip selection is distributed to GPIO 322. I2C master 326 contains the functions compatible to an I2C master device, while I2C slave 327 contains the functions compatible to an I2C slave device. Thus, in this embodiment, an NVMI device may function as an I2C master or I2C slave, but it may only function as a SPI master not a SPI slave. The arbitration block 328 is for arbitration upon multiple NVMI device communicating with each other as discussed herein. The arbitration is described in more detail below.

Pin multiplexing module 332 perform multiplexing and demultiplexing functions between the four external lines (cs0_, cs1_, sc, and sd) and the internal lines to the different functional blocks.

Note that the illustrated embodiment is exemplary only, and other embodiments encompassing the invention are possible. For example, the arbitration function may be spread over multiple state machines, the SPI and I2C masters may be combined, etc. In addition, some illustrated function blocks may be absent in some embodiments. For example, GPIO 322 may be absent when the chip select function is performed elsewhere (e.g., in the SPI/I2C master blocks). Also note that in one embodiment, when NVMI only interacts with a single SPI device, only one chip select line is needed. In other words, in one embodiment of the invention, NVMI contains only three lines, cs_, sc, and sd.

Figure 4:
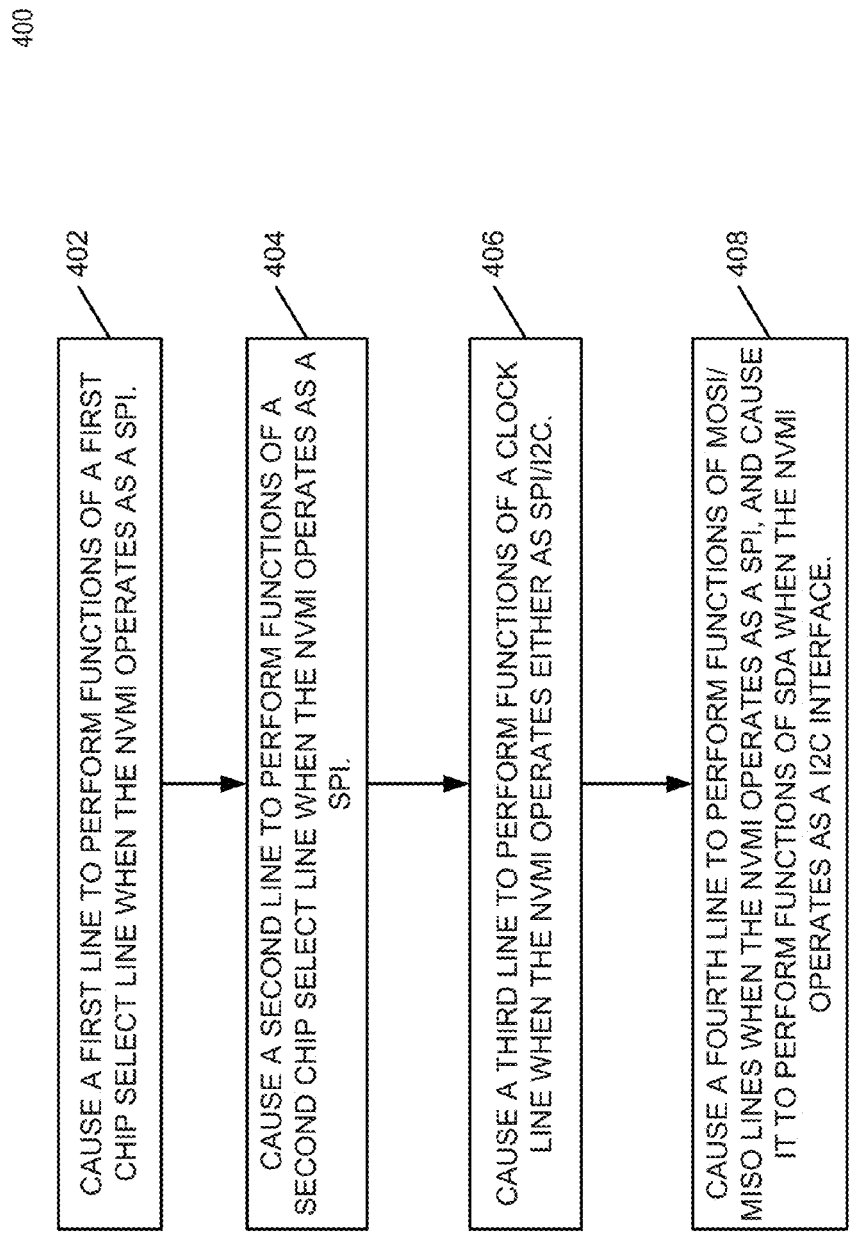
FIG. 4 illustrates a method of operating a multiprotocol nonvolatile memory interface according to one embodiment of the invention.

FIG. 4 illustrates a method of operating a multiprotocol nonvolatile memory interface according to one embodiment of the invention. Method 400 may be implemented at electronic device 300 as illustrated in FIG. 3.

At reference 402, a first line of an electronic device is caused to perform functions of a first chip select line when the serial nonvolatile memory interface of the electronic device operates as a SPI of the electronic device. At reference 404, a second line of the electronic device is caused to perform functions of a second chip select line when the serial nonvolatile memory interface operates as the SPI of the electronic device. The functions of the first and second lines are provided by GPIO 322 of FIG. 3 in one embodiment.

At reference 406, a third line of the electronic device is caused to perform functions of a clock line when the serial nonvolatile memory interface operates as either the SPI or an I2C interfaces. The functions of the third lines are provided by SPI master 324, I2C master 326, and I2C slave 327 of FIG. 3 in one embodiment.

At reference 408, a fourth line of the electronic device is caused to perform functions of MOSI/MISO lines when the NVMI operates as a SPI (the functions are provided by SPI master 324 of FIG. 3 in one embodiment). In addition, the fourth line is caused to perform functions of a serial data line when the NVMI operates as a I2C interface (the functions are provided by I2C master 326 and I2C slave 327 of FIG. 3 in one embodiment).

Conditions for Operating the Multiprotocol Nonvolatile Memory Interface

With the NVMI, the SPI signals and I2C signals coexists on the same lines (each line being implemented on a wire in one embodiment). For the signals to coexists, there are three conditions need to be met:

1) SPI 3-wire operation;
2) I2C benign SPI slave device behavior; and
3) SPI read serial data turn-around.

SPI 3-Wire Operation.

While standard SPI is technically a four-wire, full-duplex protocol, SPI NVMs are actually half-duplex devices and tri-state their serial data out when in 'write' mode. In this way the MOSI and MISO wires may be "dotted" (logically OR'ed by connection), providing that the master also tri-states serial data out during read. Thus a predictable 3-wire behavior on NVM devices is needed for the NVMI to operate properly.

I2C Benign Behavior.

The SPI Slave may not inadvertently signal an I2C Start when driving the sd wire during a read. In I2C, a bus transfer is initiated by the master signaling a Start condition by dropping SDA while SCL is held high. Likewise, a Stop condition is signaled by raising SDA when SCL is high, as described above.

I2C devices ignore the bus until a Start signal and after a Stop signal is received. Moreover, there are no ill effects of receiving a Stop signal at any time or a 'null' transaction (Start immediately followed by a Stop). Hence, the key to peaceful coexistence between SPI and I2C is, when in SPI mode, to never allow a Start condition or, if it must occur, to immediately follow it with a Stop condition. Since toggling data by itself is of no value to SPI the former policy shall be used.

Figure 5:
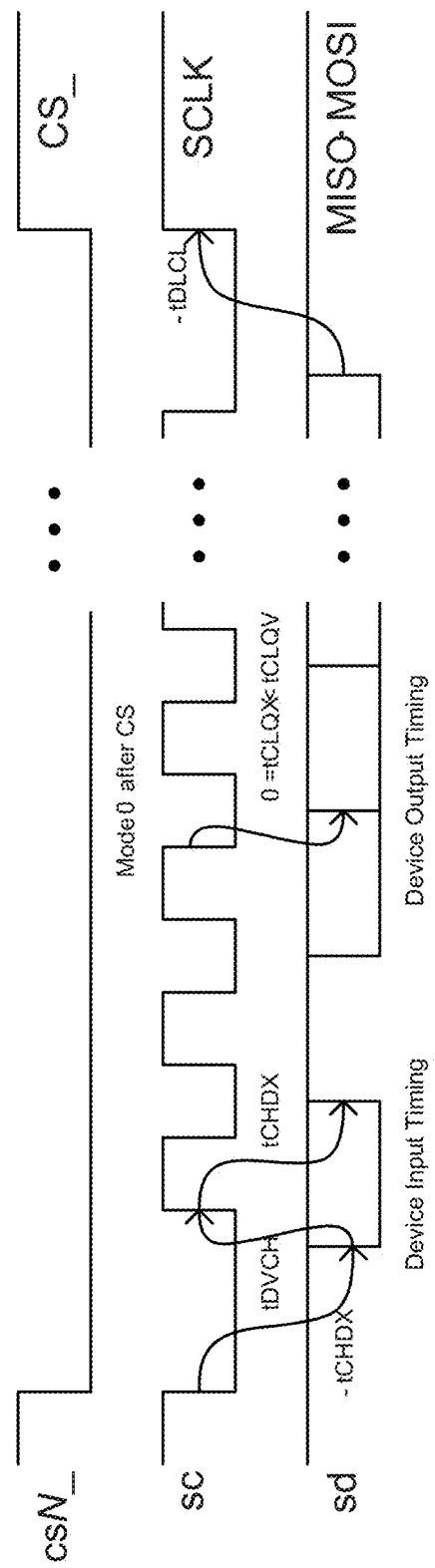
FIG. 5 illustrates I2C-safe SPI signaling.

FIG. 5 illustrates I2C-safe SPI signaling. In FIG. 5 SPI Mode 0 is used—this is compatible with all major manufacturer serial NVM devices—SCLK must be dropped sometime after csN_ and raised sometime after the last data returns to '1'. SPI Mode 3 is possible, but it returns the final clock to '1' prior to the last data—signaling a Stop condition (SDA rising while SCL high). SPI Mode 0, modified for the invention, will prevent the Stop condition. The interface timing (which is controlled by both the Master and the target SPI device) must satisfy both the I2C timing to avoid a Start condition as well as the SPI device itself for data transfer. The SPI device output timing will satisfy the Master by construction/compliance with the SPI protocol. The timing parameters are given below:

| Protocol | Parameter | Min/Max | Notes |
|---|---|---|---|
| I2C | $t_{CHDX}$ | 250/— | Start Condition Hold |
| I2C | $t_{DLCL}$ | 250/— | Start Condition Setup |
| SPI | $t_{DVCH}$ | 20/— | Data In Setup: Master satisfies -$t_{DLCL}$ ... |
| SPI | $t_{CHDX}$ | 30/— | Data In Hold: . . . and -$t_{CHDX}$ |
| SPI | $t_{CLQX}$ | 0/— | Output Hold Time: SPI devices . . . |
| SPI | $t_{CLQV}$ | —/60 | Clock Low to Output Valid: . . . also satisfy I2C. |

The values for the table above were taken from datasheets of typical devices from the major manufacturers: Atmel, ST Micro, etc. Note that the two I2C parameters are negative in the diagram in FIG. 5. This is to show the wide margin by which these parameters are met for I2C devices. For example, Start condition hold is met because the SD line drops well after SC drops. And likewise, Start condition setup will be met since SD rises long before SC rises. The interface satisfies SPI timing without signaling either a Start or Stop condition on I2C. Likewise, in I2C mode the de-selected SPI devices will ignore the interface and I2C timing will be satisfied.

SPI Read Serial Data Turn-Around.

In a SPI Write, the Master drives the sd wire throughout the transaction. Another requirement of the NVMI Master to be able to communicate to Slave SPI NVM devices is to turn around the sd wire at the correct time during reads.

The NVMI Master assumes the host processor knows the density of the NVM device (and, therefore, the length of the address) a priori so that it merely drives the output data (command and address) and manually turns-around the sd pin for reads.

Note determining the presence or size of the address space of the NVM device in a dead-reckoning situation is not precluded by NVMI Master, and a similar process is necessary for either SPI or I2C devices.

Passive Dual-Master Operations of the NVMI

As described herein above, the NVMI may operate as a SPI master and an I2C master/slave. A system comprising two NVMI masters may share access to an I2C device and may communicate to each other through I2C protocol. Passive dual-master operation only permits one master, say, master 0, to access the SPI slave devices. A foreign master 1 may gain access to the SPI slave devices by means not explicitly defined in the NVMI, by, for example, holding master 0 in the reset condition. Note that the term "host" may be used to refer to "master" in the art, and the two terms are used interchangeably in this specification.

One purpose of passive dual-master operation is to enable a foreign host (Master 1) or a test/debugger interface access to the primary host (Master 0) without the need for additional pins. Such a setup may be used to program the NVM devices in a manufacturing setting (with reset) or to act as one or more of a test, debugger, and standard input/output (stdio) interface to the primary host microprocessor. The specification refers the primary processor and NVMI master 0 as the "primary master" and the foreign host master 1 as the "secondary master."

Figure 6:
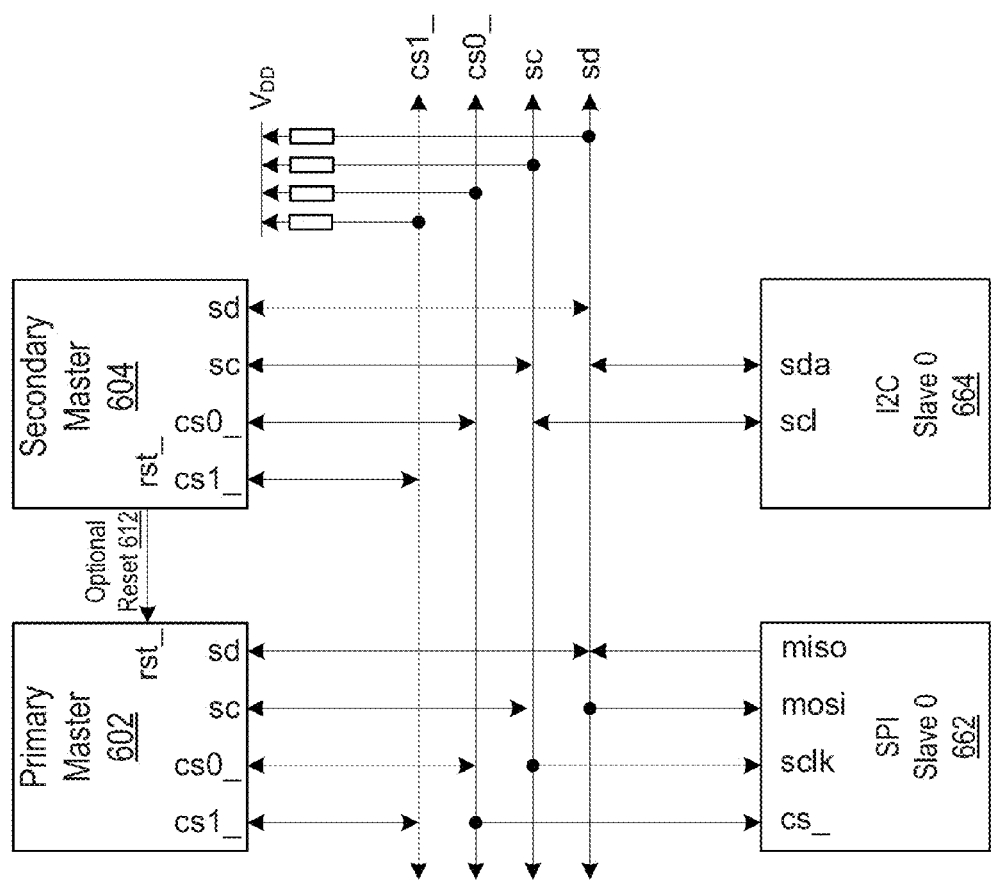
FIG. 6 illustrates a passive dual-master configuration with NVMI according to one embodiment of the invention.

FIG. 6 illustrates a passive dual-master configuration with NVMIs according to one embodiment of the invention. The dual masters are primary master 602 and secondary master 604. Secondary master 604 may optionally hold primary master 602 in reset state through an optional reset line 612, which is performed through a communication from secondary master 604 to primary master 602.

In order to achieve passive dual-master operation both masters must be NVMI compatible and only I2C protocol communications are allowed between the masters. Primary master 602 does not need to make any special accommodation to enable the passive dual-master mode, apart from enabling and supporting its I2C Slave. Secondary master 604 monitors the SPI chip-select signals and is responsible for interface arbitration.

Arbitration, as it applies to the NVMI, consists of determining which master has access to the interface, regardless of the protocol. For the two serial protocols we have the following use cases:

I2C, as a multi-master protocol, has a built-in arbitration mechanism that NVMI is compatible with.

SPI is traditionally a single-master protocol. To mesh with I2C, secondary master 504 observes the chip-select signals from primary master 602.

Primary master 602 operates assuming that it always has unfettered access to either protocol on the NVMI interface. For I2C operations it will use the standard arbitration protocol as known in the art. If primary master 602 accedes, the operation remains pending at the I2C master of the primary master

602. If an I2C slave transaction is in process when primary master 602 wishes to initiate either an SPI or I2C transaction, that transaction will remain pending until the current transaction terminates. The busy condition at the I2C slave of primary master 602 asserts immediately upon detection of the Start condition.

Bus contention occurs when both primary master 602 and secondary master 604 initiate a transaction at precisely the same moment. The following table enumerates the possible contention scenarios

| Scenario | Primary | Secondary | Solutions |
| --- | --- | --- | --- |
| 1 | I2C | I2C | Will resolve with standard I2C Arbitration |
| 2 | SPI | I2C | Secondary must accede the NVMI interface |
| 3 | — | SPI | Secondary does not initiate SPI transactions, unless the primary is in a reset state (accessing Slave NVMs). |

As indicated, in the case of pure I2C contention (scenario 1), normal arbitration will be used to resolve the contention. In the case of primary master 602 initiating a SPI transaction at precisely the same moment that the secondary master 604 initiates an I2C transaction, contention occurs, and secondary master 604 always win and secondary master 604 will signal the Stop condition immediately.

Secondary master 604 monitors the chip-select signals while initiating/arbitrating for the I2C interface. NVMI is a single access interface and primary master 602 will begin initiating an SPI transaction by asserting csN_ before (sometimes long before as discussed in more detail herein below) it actually begins the data transfer. In one embodiment, the delay is in tens of microseconds to no more than 100 or so microseconds. The chip-select assertion is under processors' control (through host processor interface 302 and GPIO interface block 322 of FIG. 3 for example), so the delay interval from asserting csN_ and data transfer is adjustable to the system requirements. The delay interval allows secondary master 604 to park the I2C interface if a transaction on primary master 602 was started.

Figures 7A, 7B:
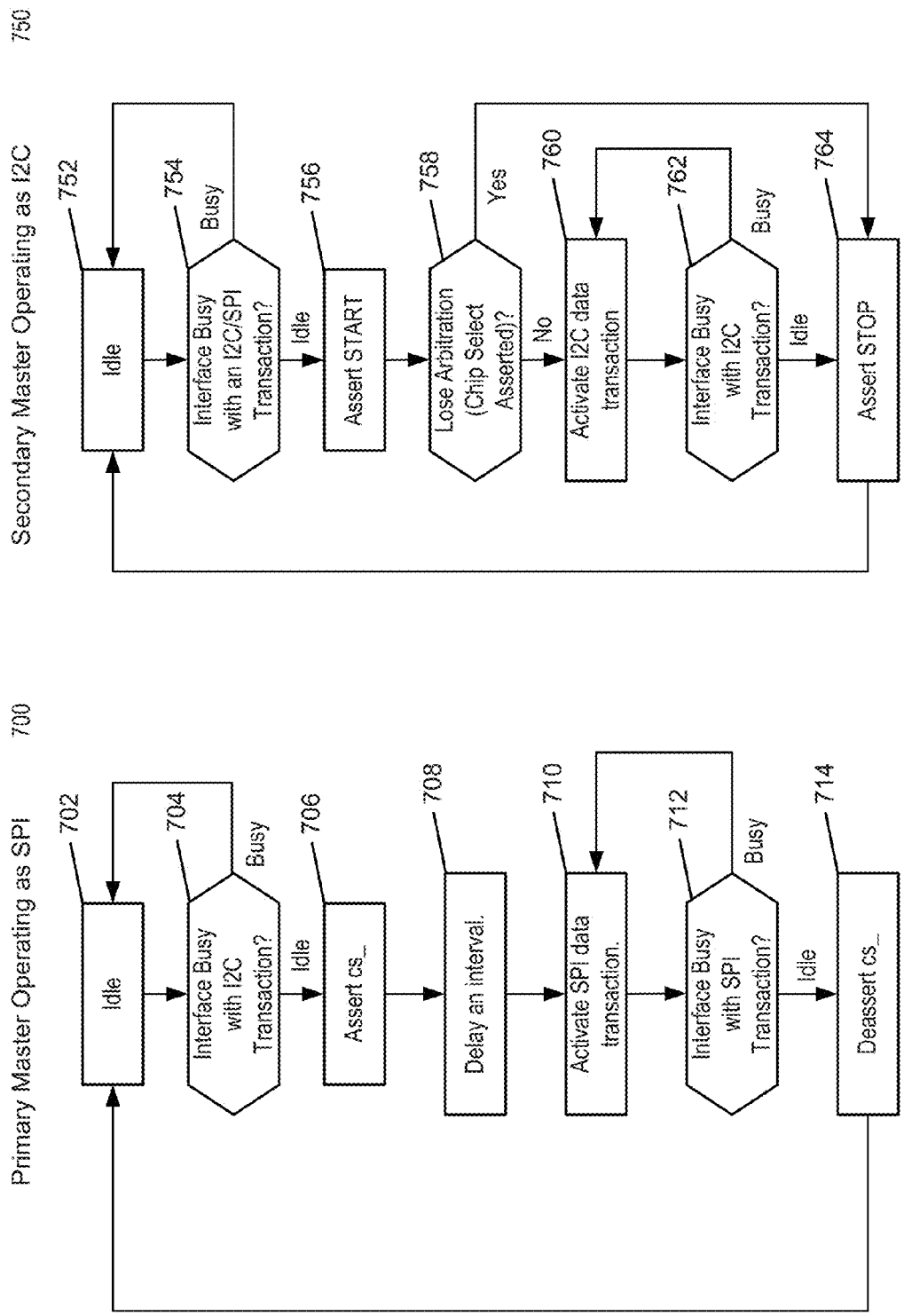
FIG. 7A-B illustrates arbitration/initiation of both a primary NVMI master and a secondary NVMI master according to one embodiment of the invention.

FIG. 7A-B illustrates arbitration/initiation of both a primary NVMI master and a secondary NVMI master according to one embodiment of the invention. The primary master and secondary master may contain identical hardware, and they may operate on two disparate electronic devices or the same electronic device. The secondary master does not use its SPI interface in the arbitration/initiation process (as a secondary master does not initiate SPI transactions unless the primary is in a reset state as discussed herein above). The primary and secondary masters may be configured as primary master 602 and secondary master 604 respectively as illustrated in FIG. 6 in one embodiment.

FIG. 7A illustrates a state machine for a primary NVMI master for SPI arbitration/initiation according to one embodiment of the invention. FIG. 7B illustrates a state machine for a corresponding secondary NVMI master for I2C arbitration/initiation according to one embodiment of the invention.

The two state machines have symmetry as they operate concurrently to maintain a consistent system state during contention. The state machines start from the idle state at references 702 and 752 respectively. Assume that both NVMI masters receive a pending operation at the same moment for the interfaces. The interface may operate as an SPI interface or an I2C interface at the primary NVMI master, and it may operate as an I2C interface at the secondary NVMI master. At the secondary NVMI master, it checks if the interface lines are busy with either an I2C or SPI transaction (e.g., checking if the data/clock lines sd/sc is busy for I2C transaction and checking csN_ for SPI transaction) at reference 754. At the primary NVMI master, it checks only if the interface lines are busy with an I2C transaction at reference 704. The primary NVMI master can reliably be assured that the chip-select will never be asserted (as the secondary NVMI master does not initiate SPI transactions). In both cases, if the interface lines are busy, the state machines go back to idle state. Otherwise, the state machines go to references 706 and 756 respectively. At reference 706, the primary master asserts chip select on one of its chip select line csN_, the line selection depending on configuration for the pending SPI transaction. At reference 756, the secondary master asserts Start at its sd/sc lines.

For the primary master, after asserting cs_ to indicate its intention to transfer data using the NVMI (the primary master NVMI operating as SPI), at reference 708, the primary master delays an interval before transmitting data after asserting csN_. That is, the primary master holds off from data transfer no earlier than the interval after indicating its intention to transfer data. The interval may be determined by the processor of the electronic device containing the primary NVMI master interface, and it may be adjusted by the processor depending on implementation.

For the secondary master, after asserting Start to indicate its intention to transfer data using the NVMI (the secondary NVMI operating as I2C interface), at reference 758, it goes to arbitration, which is to check whether or not the chip select line is asserted or not in one embodiment. If it detects the asserted cs_ by the primary master, it then goes to reference 764 and asserts STOP. The state machine 750 goes to activating the I2C data transfer at reference 760 only if the secondary master wins the arbitration.

In the meantime, after the interval period expires at the primary master, the primary master activates SPI data transaction (e.g., data transfer) at reference 710. The data transfer continues when the pending operations have data to transfer thus keeping the NVMI interface busy with SPI data transaction at reference 712. When there are no more pending operations thus the NVMI interface goes to idle state, the state machine goes to deassert the chip select line at reference 714, and the state machine returns to idle state at reference 702.

Similarly at the secondary master, the secondary master activate I2C data transaction (e.g., data transfer) at reference 760. The data transfer continues when the pending operations have data to transfer thus keeping the NVMI interface busy with I2C data transaction at reference 762. When there are no more pending operations thus the NVMI interface goes to idle state, the state machine asserts Stop at reference 764, and the state machine returns to idle state.

Figure 8:
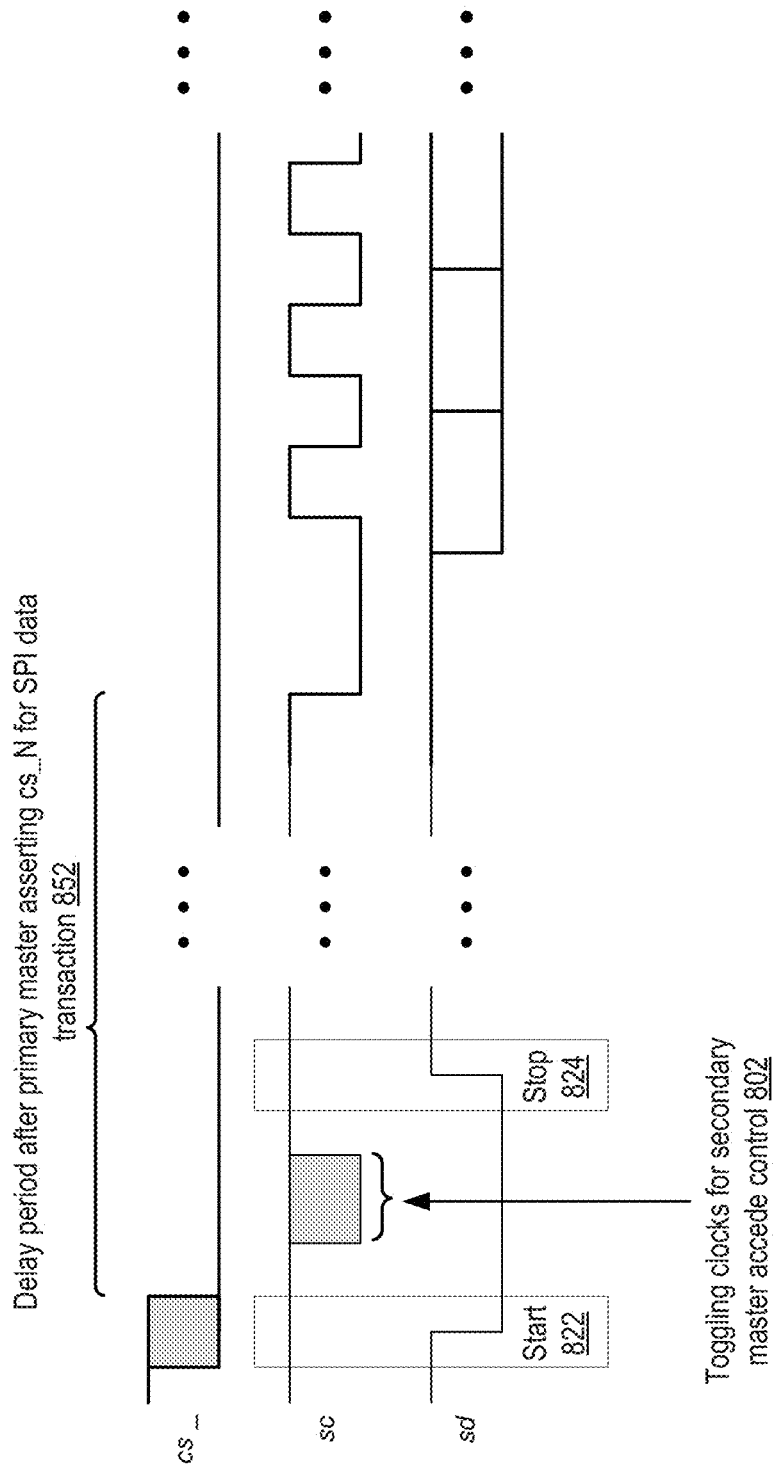
FIG. 8 illustrates arbitration events of the primary and secondary NVMI masters according to one embodiment of the invention.

With the delay of primary master at reference 708, the I2C slave devices to the primary and secondary masters are prevented from misinterpreting SPI signaling as I2C traffic (no SPI signaling is sent prior to arbitration completes). The primary master would not signal an I2C START but could possibly cause the secondary master to synchronize to its timing for multi-master operation. The delay interval prevents any ambiguities of signal/data. FIG. 8 illustrates arbitration events of the primary and secondary NVMI masters according to one embodiment of the invention.

Referring to FIG. 8, a primary master asserts its intention to start SPI data transaction through asserting a chip select signal on a chip select line cs_. The primary master then waits for a delay period at reference 852, and start SPI data transaction. While the primary master asserts on cs_, a secondary master asserts Start at reference 822 to indicate its intention of start I2C data transaction. It then goes through an arbitration phase, where the secondary master detects the chip select line being busy (asserted by the primary master). If the clock signal is pulled low after the Start signal for the I2C data transaction it is returned to high within duration 802 before the secondary master signal Stop signal at reference 824.

Note that the burden of arbitration and accession is shifted to the secondary master. While the same NVMI hardware may be present on both interfaces, the secondary master enables arbitration and the primary master complies with the delayed data transfer regardless of whether a secondary master is present or not.

Also note that during the device access phase (e.g., references 710-712 in FIG. 7A), when the primary master has exclusive access to the bus shared between the primary and secondary masters, it actively drives (push-pull) the sc and sd lines to achieve the higher speeds of SPI. In I2C mode, the sc and sd lines remain open-drain throughout the transactions.

Multi-Master SPI Operations of the NVMI

Multi-master SPI operations enable multiple NVMI masters access to the SPI and/or I2C slave devices. In order to communicate between NVMI masters, the I2C protocol is used in one embodiment. Multi-master SPI operation is predicated on each node (either a master or slave) having a unique node identification (ID). For example, for NVMI, the unique ID may be stored in OTP 352 as illustrated in FIG. 3.

In one embodiment, multi-master uses some of the concepts from I2C on the chip-select lines to arbitrate for access to communication bus between the masters and slave devices. Thus, the chip-select signals are dual purposed to carry out the multi-master SPI arbitration signal as illustrated the following table according to one embodiment of the invention.

| NVMI | Arbitration |
| --- | --- |
| cs1_ | ac (clock) |
| cs0_ | ad (data) |
| sc | I2C SCL |
| sd | I2C SDA |

The cs1_ line becomes the arbitration clock (ac) and the cs0_ line becomes the arbitration data (ad). The ac/ad lines are pseudo-open-drain such that a master may pull them low and they are pulled high by a resister (on-chip or on-board). The multi-master protocol still complies with the initial delay of the passive dual-master protocol. SPI 'start' is initiated by either cs_ being asserted. In addition, in the multi-master protocol, any master signals its intention to use the bus by asserting ac with or without ad (SPI slaves will not be adversely affected by these 'null' transactions). In this way the arbitration differs from I2C protocol. There will still be a delay between the time the requesting master asserts chip-select (ac with or without ad) and data transfer begins on the sc and sd lines, to comply with the passive, dual-master mode discussed herein above. During this period, additional signaling occurs on the ac and ad lines.

Traditionally the lines for SPI operations are busy if either of the two chip-select lines is asserted. In multi-master mode, it is possible for two or more NVMI masters to attempt to access the shared bus simultaneously. To resolve bus contention, each master will drive M clocks cycles onto the ac line, where M is the ceiling of ($log_2$(number of masters)). On the ad line, each master that is vying for the NVMI bus will drive its node ID, most significant bit (MSB) first with one bit in each clock in one embodiment. For example, if there are 8 masters in a system, each master (node) that wishes to gain access will drive M=3 clock cycles and output their node ID onto the wire. Bystander masters track the arbitration clocks and consider the bus busy during the arbitration phase.

The masters will also monitor the ad line. If they detect the ID on the ad line does not match their own they will accede the bus and their operation remains pending until the bus goes idle. In this way the arbitration uses a fixed priority with the lowest node ID having the highest priority.

Figure 9:
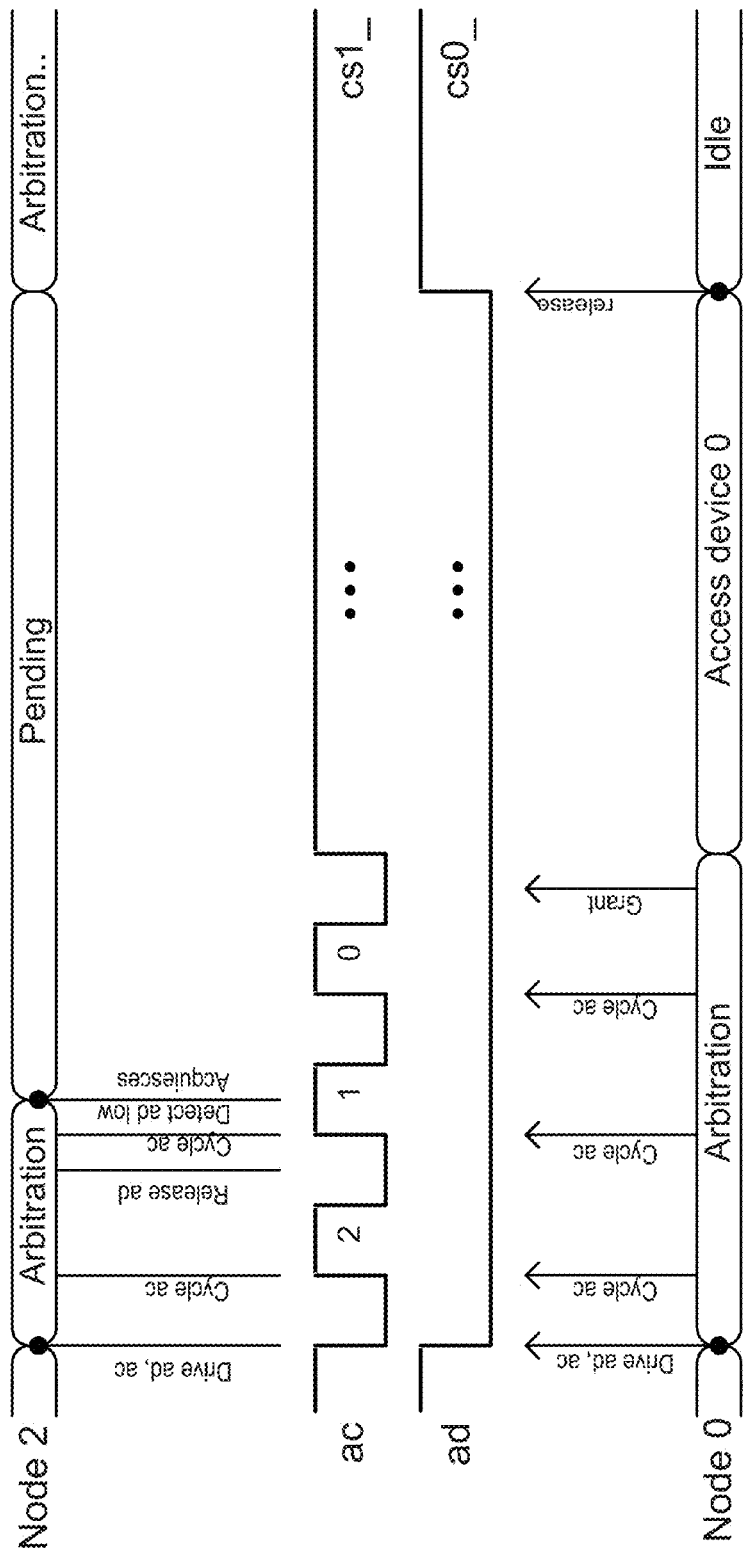
FIG. 9 illustrates a first arbitration process of multi-master SPI operations according to one embodiment of the invention.

FIG. 9 illustrates a first arbitration process of multi-master SPI operations according to one embodiment of the invention. Nodes 0 and 2 are two masters of a seven master system (nodes discussed below may function as SPI masters unless otherwise indicated). Ceiling of $log_2$ (number of masters) =ceiling of $log_2$ 7=3. Thus 3 clock cycles are needed to resolve NVMI bus contention. Both nodes's IDs (000 and 010 respectively for nodes 0 and 2) have 0 in the MSB, bit 2, so they both proceed onto the second bit, bit 1. At this point, node 2 observes that the ad line is pulled low, not high as it expects (0$\overline{1}$0). The ad line is pulled low as both nodes 2 and 0 drives the ac lines (node 2 to pull the line high and node 0 to pull the line low respectively), and the logic AND results bit 1 being pulled to low. After node 2 observes that the ad line does not match their own, it accede the bus. Node 0 proceeds onto the third bit, bit 0. At this point, node 0 observes that its node ID on the ad line, and it wins the arbitration.

In this example, node 0 wishes to access SPI device 0, thus, it leaves adlcs0_ line low, and de-asserts aclcs1_ after obtaining the grant. That is, in multi-master SPI operations, after the $M^{th}$ clock cycle on the ac line, the ac/ad lines revert to serve as chip-select line csN_. One or both csN_ must be asserted, else the NVMI bus is considered idle.

Figure 10:
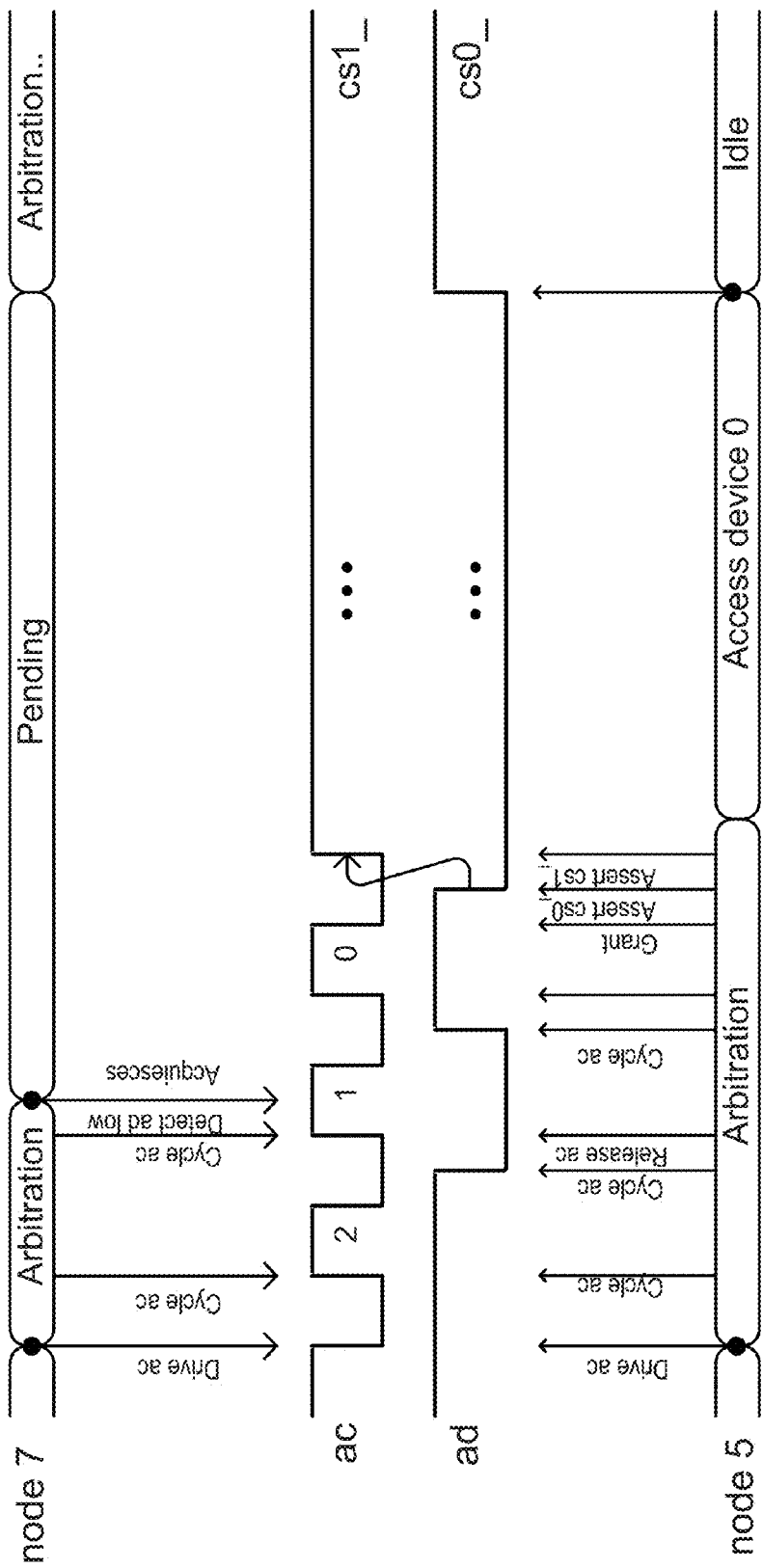
FIG. 10 illustrates a second arbitration process of multi-master SPI operations according to one embodiment of the invention.

FIG. 10 illustrates a second arbitration process of multi-master SPI operations according to one embodiment of the invention. Nodes 5 and 7 are two masters of an eight master system. Ceiling of $log_2$ (number of masters)=ceiling of $log_2$ 8=3. Thus 3 clock cycles are still needed to resolve NVMI bus contention. Similar to the system in FIG. 9, nodes 5 and 7 have the same MSB bit value (at 1 in this case) thus both proceed onto the second bit, bit 1. At which point, node 7 accedes.

In this example, node 5 wishes to access SPI device 0 again, thus it turns around the chip-selects by asserting cs0_ before de-asserting cs1_. The falling edge of ac for ad bit 0 marks the end of the arbitration phase. Bystander nodes with operations pending will wait for both chip-selects to deassert before attempting to access the bus. This is why in this example node 5 must assert cs0_ prior to deasserting cs1_—otherwise the bystander nodes might detect bus idle and attempt to launch a new transaction.

Figure 11:
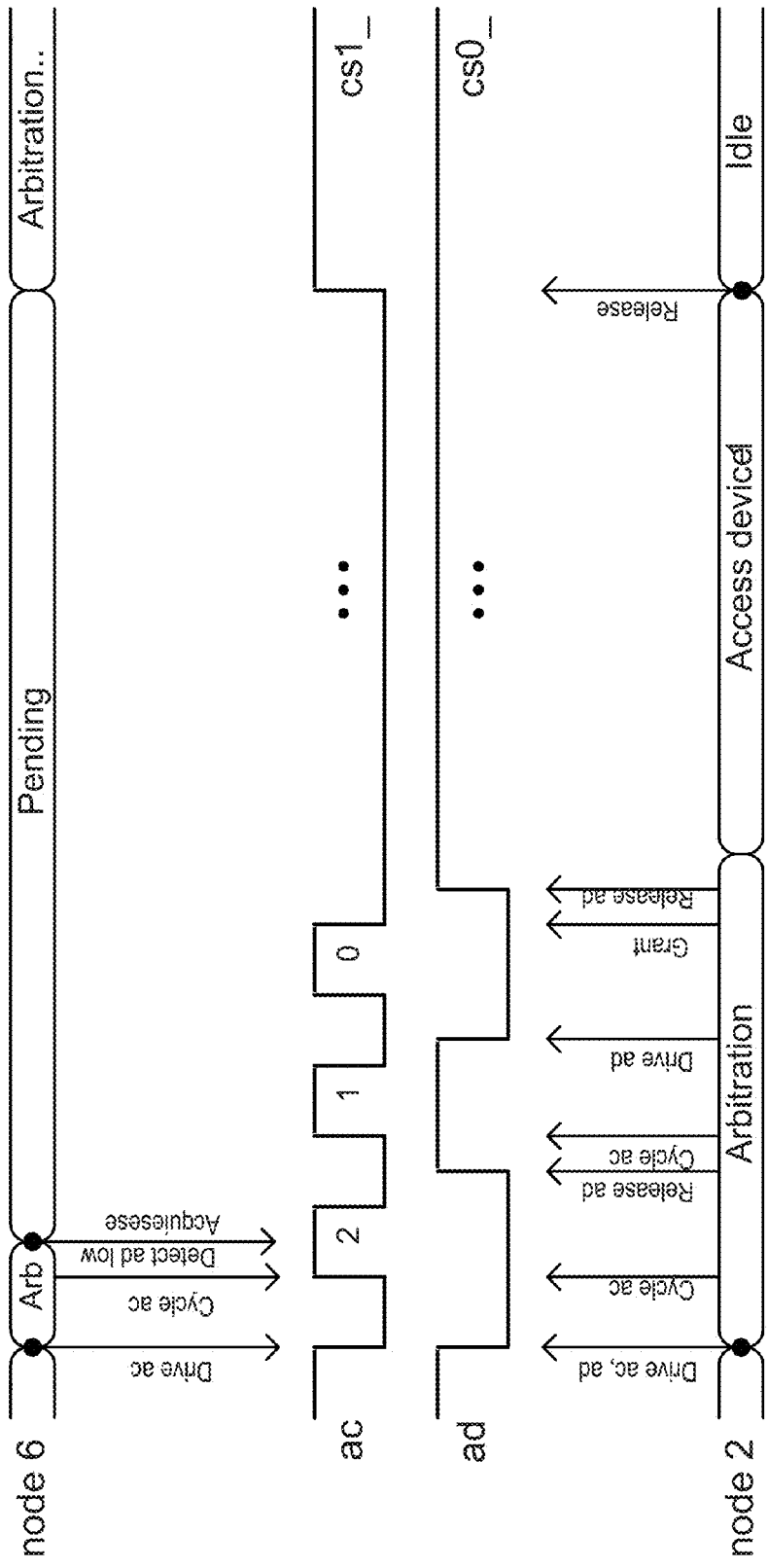
FIG. 11 illustrates a third arbitration process of multi-master SPI operations according to one embodiment of the invention.

FIG. 11 illustrates a third arbitration process of multi-master SPI operations according to one embodiment of the invention. Nodes 2 and 6 are two masters of an eight master system similar to FIG. 10 and 3 clock cycles again are need to resolve NVMI bus contention. Node 6 accedes at the MSB as the bit 2 value is different between the two nodes. In this example, node 2 wishes to access SPI device 1. Since aclcs1_ is already asserted, node 2 needs to release adlcs0_ before accessing SPI device 1.

Note that I2C is still viable on the bus. If at any point during the multi-master SPI arbitration or the passive dual-master window (not shown in the diagrams) an I2C start is detected then each master will immediately accede the bus (releasing the ac and ad lines).

Multi-master SPI arbitration is made possible by using pseudo-open-drain outputs and borrowing the concepts of multi-master clock-synchronization from the I2C protocol. The ac clock frequency is a system-wide parameter, but variations can occur as well as phase shifts due to the random access to the bus. Clock synchronization is enabled by the initiator node first setting ac to the desired value, then waiting for it to transition to the desired value before starting the timer for the pulse width period. This works for the low-to-high transition as this may be delayed by another node. This is referred to as "clock stretching". Note also, that the nodes must monitor the ac line when it is high. If a high-to-low transition occurs prior to the pulse-width period timer expires the node must abandon the timer and consider the pulse terminated and react accordingly. This is "clock clipping" but is not mentioned explicitly in I2C.

Figure 12:
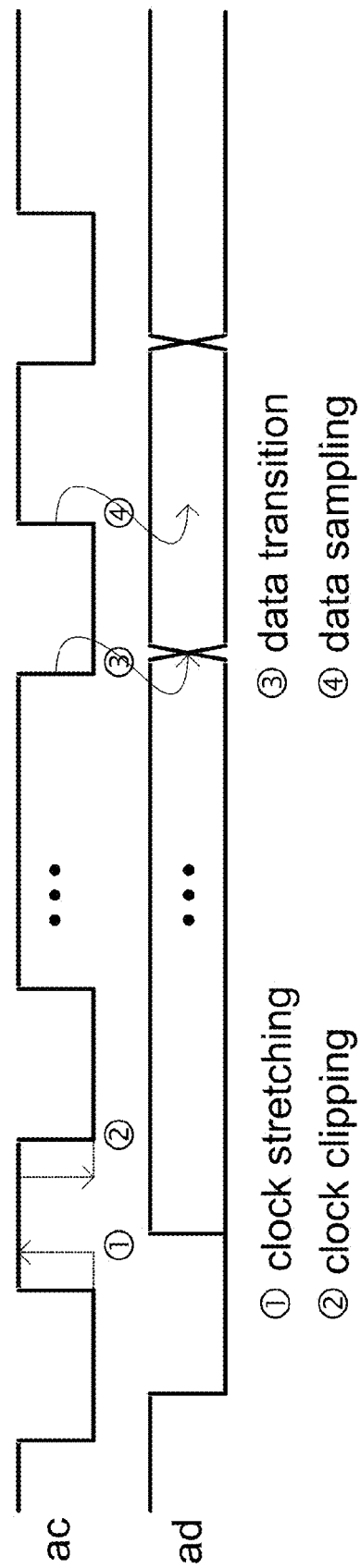
FIG. 12 illustrates clock stretching and clipping during multi-master SPI arbitration according to one embodiment of the invention.

FIG. 12 illustrates clock stretching and clipping during multi-master SPI arbitration according to one embodiment of the invention. Clock stretching lengths the low pulse width—to synchronize the local timer should not be started until the clock transition is detected. Clock clipping occurs when a faster node terminates the high pulse width early. This has the effect of shortening the high pulse width.

FIG. 12 also shows the data transition and sampling points. The ad line transitions occur after the low-going edge of ac and ad is sampled after the high-going edge of ac. At the sample point the 'losing' node will have both ac and ad in the high-impedance state and may accede without any changes to the bus interface. The losing and by-stander nodes maintain the bus busy state through the arbitration phase and access phase until both chip-selects are deasserted.

As with any complex system, unexpected and external events may cause the bus to appear busy to all nodes or other hangs or deadlocks may occur. One or more nodes should maintain a bus busy timeout and if the busy condition persists beyond a reasonable access time, some system recovery procedure should be initiated.

In one embodiment, a multi-master system uses fixed priority based on the node ID as discussed herein above. Additional fairness may be gained by enforcing a bus access hold-off for the 'winning' node after the access is complete, but, in practice a node which has just accessed the bus will likely have no need to access it again for an application-dependent period of time. If the NVMI becomes the system bottleneck then a re-partitioning of the NVM function would be suggested.

In summary, the requirements for multi-master SPI arbitration include:
  Each node has a unique node ID, possibly from on-chip OTP;
  System-wide parameter M=ceiling(log$_2$(nodes in system)) is known to all nodes;
  Common ac clock frequency; and
  One or more nodes maintain global busy timeout and initiate recovery.

The NVMI pins for each mode can be summarized below according to one embodiment of the invention:

| NVMI Lines | SPI | I2C | Passive-Dual | Multi-Master |
|---|---|---|---|---|
| cs1_ | CS1_ (SPI 1) | — | CS1_ (SPI 1) | ac (Arb Clock) |
| cs0_ | CS0_ (SPI 0) | — | CS0_ (SPI 0) | ad (Arb Data) |
| sc | SCLK | SCL | SCL | SCL |
| sd | MISO/MOSI | SDA | SDA | SDA |

Figure 13:
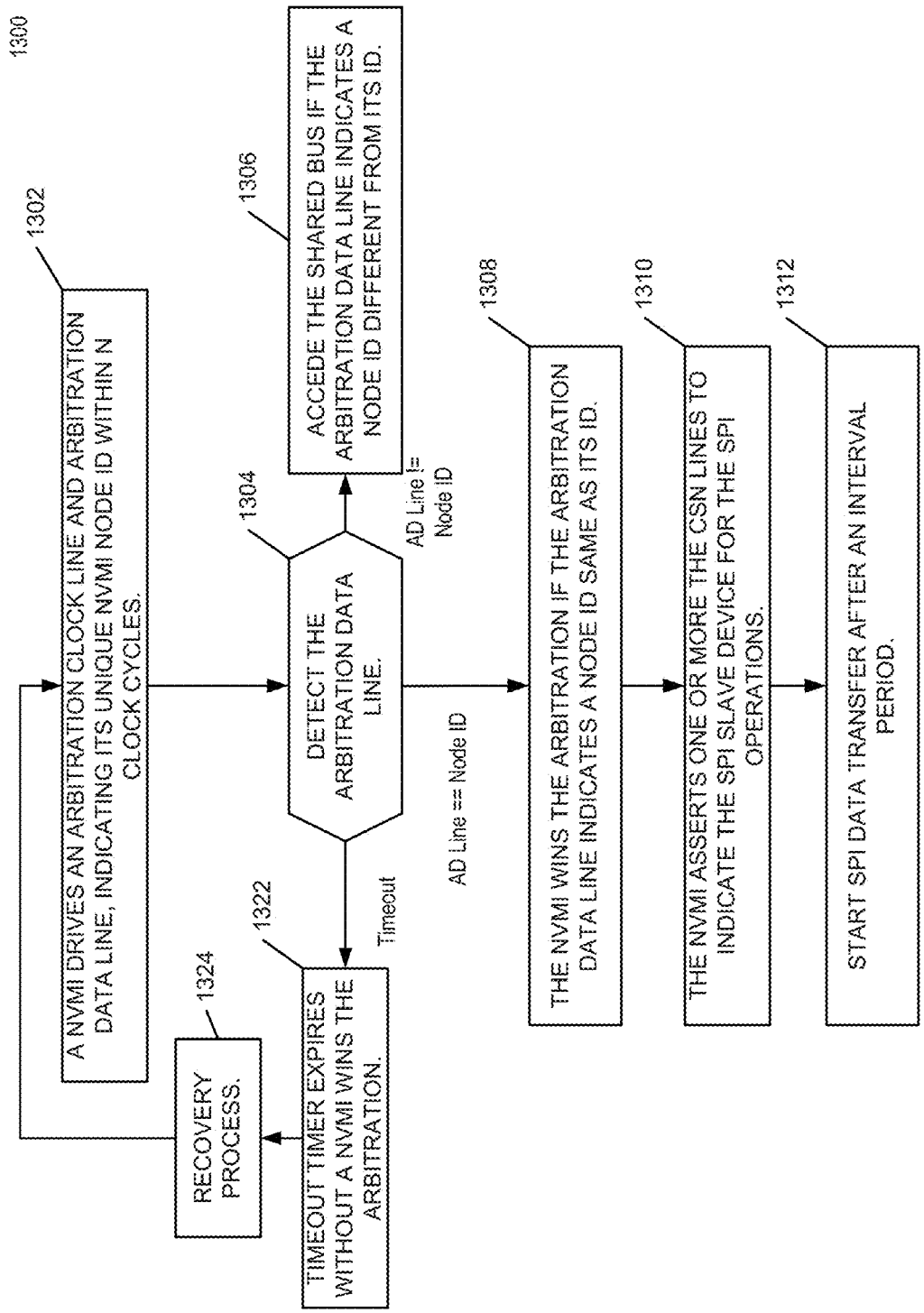
FIG. 13 illustrates a method of access arbitration for multi-master SPI operations according to one embodiment of the invention.

FIG. 13 illustrates a method of access arbitration for multi-master SPI operations according to one embodiment of the invention. Method 1300 may be implemented at one electronic device such as electronic device 300 illustrated in FIG. 3. Method 1300 includes operations on a multi-master NVMI devices having a shared bus managing a set of SPI and I2C devices.

At reference 1302, each of multiple NVMI masters drives an arbitration clock line and an arbitration data line, which together indicate its unique NVMI node ID. The arbitration clock line and the arbitration data line are chip select lines in one embodiment. The node ID is indicated in a predetermined number of clock cycles. In one embodiment, the number of clock cycles is determined by ceiling(log$_2$ (nodes in system)).

At reference 1304, each of multiple NVMI masters detects the arbitration data line. If the arbitration data line indicates a node ID different from its own at reference 1306, the NVMI master accedes the shared bus and it loses the arbitration thus cannot perform its SPI operations.

If the arbitration data line indicates its node ID at reference 1308, the NVMI master wins the arbitration. The NVMI master then asserts the chip select lines indicating the SPI slave device for its SPI operations at reference 1310. After an interval period, the NVMI master starts SPI data transfer at reference 1312.

If no NVMI wins the arbitration, a timeout timer expires at reference 1322. The NVMI then starts a recovery process at reference 1324. The recovery process is to get out a potential deadline state. After the recovery process, the process goes back to reference 1302 to restart the arbitration process.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An electronic device to be coupled to a set of electronic devices, each of the set of electronic devices including an interface for coupling to the electronic device, each interface being either a serial peripheral interface (SPI) or an inter-integrated circuit (I2C) interface, the electronic device comprising:
  a first serial nonvolatile memory interface, through which the first electronic device is coupled to the set of electronic devices, the first serial nonvolatile memory interface including:
    a first line operative to perform functions of a first chip select line when the serial nonvolatile memory interface operates as a SPI of the electronic device;
    a second line operative to perform functions of a second chip select line when the serial nonvolatile memory interface operates as the SPI of the electronic device;
    a third line operative to perform functions of a clock line when the serial nonvolatile memory interface operates as either the SPI or an I2C interface of the electronic device; and
    a fourth line configured to perform functions of a mast-out-slave-in (MOSI) line and a master-in-slave-out (MISO) line when the serial nonvolatile memory interface operates as the SPI of the electronic device, the fourth line further operative to perform functions of a serial data line when the serial nonvolatile memory interface operates as the I2C interface of the electronic device.

2. The electronic device of claim 1, wherein the fourth line is to wait for an interval period to transfer data after the serial nonvolatile memory interface asserts its intention to transfer the data as the SPI of the electronic device.

3. The electronic device of claim 1, wherein each of the four lines of the first serial nonvolatile memory interface is to be coupled to corresponding four lines of a second serial nonvolatile memory interface, wherein the second serial nonvolatile memory interface is to be coupled to the set of electronic devices, wherein only one of the two interfaces may access to the set of electronic devices at one time.

4. The electronic device of claim 3, wherein the second serial nonvolatile memory interface is operative to reset the first serial nonvolatile memory interface through a reset signal so that the first nonvolatile memory is to enter a reset condition.

5. The electronic device of claim 1, further comprising an identifier, the identifier being used to uniquely identify the first serial nonvolatile memory interface.

6. The electronic device of claim 5, wherein the identifier is to be stored in on-chip one-time programmable (OTP) memories of the electronic device.

7. The electronic device of claim 5, wherein the electronic device is to utilize the identifier to resolve contention among the first serial nonvolatile memory interface and a set of serial nonvolatile memory interfaces, wherein each of the set of serial nonvolatile memory interface is to contain the same four lines as the first serial nonvolatile memory interface, wherein the set of serial nonvolatile memory interfaces is to be coupled to the first nonvolatile memory interface through four shared bus lines, each shared bus line being shared among one of the four lines of the first serial nonvolatile memory interface and the set of serial nonvolatile memory interfaces.

8. The electronic device of claim 7, wherein the contention is resolved through the shared bus lines for the first and second chip select lines.

9. The electronic device of claim 8, wherein each of the first serial nonvolatile memory interface and the set of serial nonvolatile memory interfaces is to drive its identifier to the shared bus lines for the first and second chip select lines, and wherein upon observing the shared bus lines indicating an identifier different from its own, a serial nonvolatile memory interface is to accede the shared bus lines.

10. The electronic device of claim 7, further comprising a timeout timer, expiration of which without contention being resolved is to cause starting of a recovery process.

11. A method of communicating between an electronic device and a set of electronic devices via a nonvolatile memory interface, each of the set of electronic devices including an interface for coupling to the electronic device, each interface being either a serial peripheral interface (SPI) or an inter-integrated circuit (I2C) interface, the method comprising:

causing a first line of the electronic device to perform functions of a first chip select line when the serial nonvolatile memory interface operates as a SPI of the electronic device;

causing a second line of the electronic device to perform functions of a second chip select line when the serial nonvolatile memory interface operates as the SPI of the electronic device;

causing a third line of the electronic device to perform functions of a clock line when the serial nonvolatile memory interface operates as either the SPI or an I2C interface of the electronic device; and causing a fourth line of the electronic device to perform functions of a mast-out-slave-in (MOSI) line and a master-in-slave-out (MISO) line when the serial nonvolatile memory interface operates as the SPI of the electronic device, the fourth line further operative to perform functions of a serial data line when the serial nonvolatile memory interface operates as the I2C interface of the electronic device.

12. The method of claim 11, wherein the fourth line waits for an interval period to transfer data after the serial nonvolatile memory interface asserts its intention to transfer the data as the SPI of the electronic device.

13. The method of claim 11, wherein each of the four lines of the first serial nonvolatile memory interface is coupled to corresponding four lines of a second serial nonvolatile memory interface, wherein the second serial nonvolatile memory interface is coupled to the set of electronic devices, wherein only one of the two interfaces may access to the set of electronic devices at one time.

14. The method of claim 13, wherein in order to enter the first nonvolatile memory to a reset condition, the second serial nonvolatile memory interface resets the first serial nonvolatile memory interface through a reset signal.

15. The method of claim 11, wherein the electronic device contains an identifier, the identifier being used to uniquely identify the first serial nonvolatile memory interface.

16. The method of claim 15, wherein the identifier is stored in on-chip one-time programmable (OTP) memories of the electronic device.

17. The method of claim 15, wherein the electronic device utilizes the identifier to resolve contention among the first serial nonvolatile memory interface and a set of serial nonvolatile memory interfaces, wherein each of the set of serial nonvolatile memory interface contains the same four lines as the first serial nonvolatile memory interface, wherein the set of serial nonvolatile memory interfaces is coupled to the first nonvolatile memory interface through four shared bus lines, each shared bus line being shared among one of the four lines of the first serial nonvolatile memory interface and the set of serial nonvolatile memory interfaces.

18. The method of claim 17, wherein the contention is resolved through the shared bus lines for the first and second chip select lines.

19. The method of claim 18, wherein each of the first serial nonvolatile memory interface and the set of serial nonvolatile memory interfaces drives its identifier to the shared bus lines for the first and second chip select lines, and wherein upon observing the shared bus lines indicating an identifier different from its own, a serial nonvolatile memory interface accede the shared bus lines.

20. The method of claim 17, wherein the electronic device further contains a timeout timer, expiration of which without contention being resolved causes starting of a recovery process.

* * * * *